(12) United States Patent
Hsu

(10) Patent No.: US 7,898,528 B2
(45) Date of Patent: *Mar. 1, 2011

(54) NOTEBOOK COMPUTER WITH HIDDEN TOUCH PAD

(75) Inventor: Kuo-Jung Hsu, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 226 days.

This patent is subject to a terminal disclaimer.

(21) Appl. No.: 10/661,587

(22) Filed: Sep. 15, 2003

(65) Prior Publication Data

US 2004/0136154 A1    Jul. 15, 2004

(30) Foreign Application Priority Data

Jan. 15, 2003    (TW) ............................... 92100759 A

(51) Int. Cl.
*G06F 3/041* (2006.01)
*G06F 1/16* (2006.01)

(52) U.S. Cl. ............... 345/173; 361/679.27; 361/679.55

(58) Field of Classification Search ................. 345/156, 345/173–178; 361/679–687, 212; 248/118–118.3; 312/223.1–223.2; 206/759–760; D14/318
See application file for complete search history.

(56) References Cited

U.S. PATENT DOCUMENTS

| | | | | |
|---|---|---|---|---|
| 5,854,625 A * | 12/1998 | Frisch et al. | ................. | 345/173 |
| 6,219,038 B1 * | 4/2001 | Cho | ............................ | 345/173 |
| 6,388,660 B1 * | 5/2002 | Manser et al. | ............... | 345/173 |
| 6,501,462 B1 * | 12/2002 | Garner | ........................ | 345/173 |
| 6,756,971 B1 * | 6/2004 | Ramey et al. | ................ | 345/173 |
| 6,824,321 B2 * | 11/2004 | Ward et al. | ................... | 400/479 |
| 6,933,929 B1 * | 8/2005 | Novak | ......................... | 345/173 |
| 7,348,964 B1 * | 3/2008 | Gettemy et al. | ............. | 345/173 |
| 2002/0063694 A1 * | 5/2002 | Keely et al. | .................. | 345/173 |
| 2004/0019724 A1 * | 1/2004 | Singleton et al. | ............ | 710/303 |

FOREIGN PATENT DOCUMENTS

| | | |
|---|---|---|
| JP | 10-133777 | 5/1998 |
| JP | 2002-297309 | 10/2002 |
| JP | 2002-328772 | 11/2002 |
| KR | 1999-0015509 | 3/1999 |

\* cited by examiner

*Primary Examiner*—Stephen G Sherman
(74) *Attorney, Agent, or Firm*—Rabin & Berdo, PC

(57) ABSTRACT

A notebook computer with a hidden touch pad. The notebook computer includes a main portion, a display, and a touch pad. The main portion includes a housing, and the housing includes a receiving portion. The display is connected to the main portion in a rotatable manner. The receiving portion is formed on the internal surface of the housing. The touch pad is disposed in the receiving portion and thus is unexposed.

19 Claims, 7 Drawing Sheets

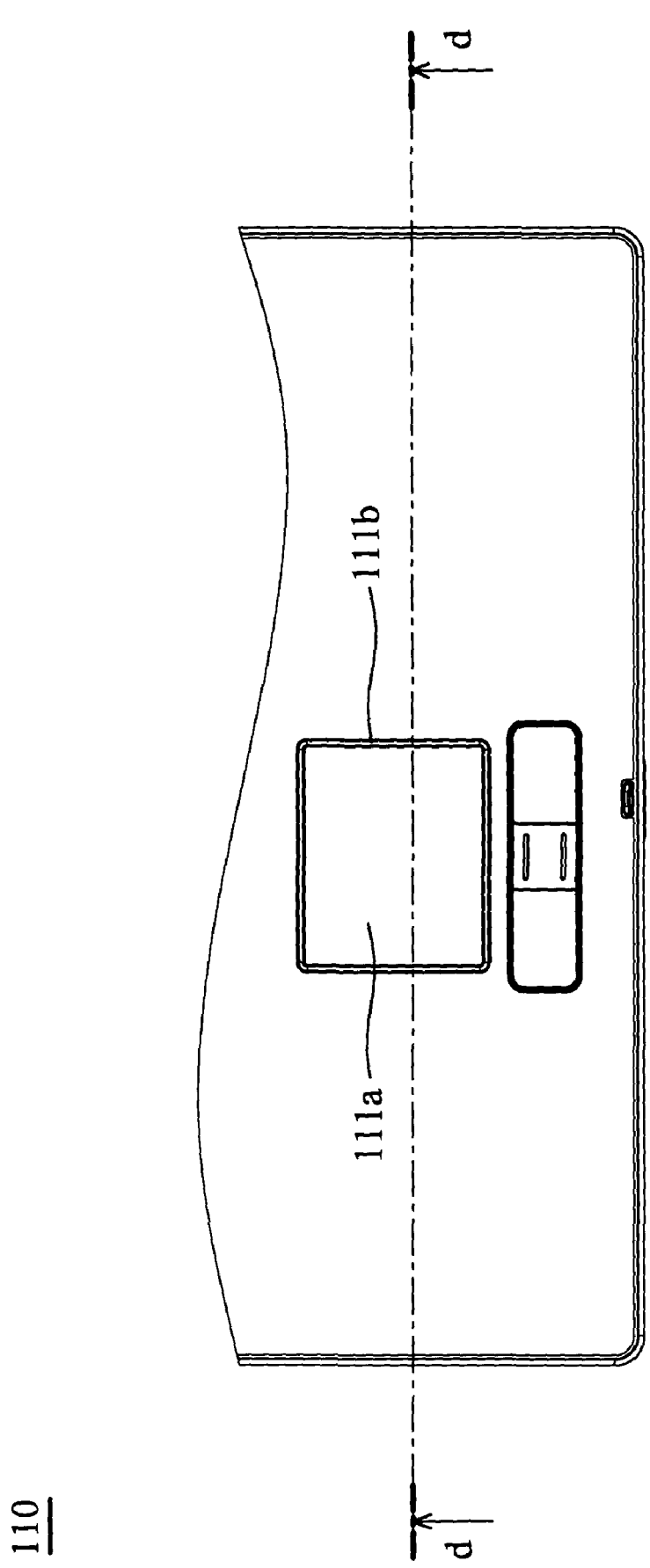

NOTEBOOK COMPUTER WITH HIDDEN TOUCH PAD

BACKGROUND OF THE INVENTION

1. Field of the Invention

The invention relates to a notebook computer and a manufacturing method thereof; in particular, to a notebook computer with a hidden touch pad.

2. Description of the Related Art

A touch pad is a necessary component in most notebook computers. By means of the touch pad, the user is able to move the cursor and otherwise interact with the computer.

As shown in FIG. 1a and FIG. 1b, a touch pad 14 is disposed in a conventional notebook computer 10. A through hole 13 is formed on a top housing 12 of a main portion 11 so as to expose the touch pad 14 disposed in the main portion 11 for the user to operate. That is, the top housing 12 must be provided with the hole 13.

Furthermore, during manufacture, the touch pad 14 is disposed in the main portion 11 by an engaging member 15.

However, since the top portion of the housing is provided with the hole, water cannot be prevented from entering the main portion through the hole. That is, external vapor can enter the main portion through the hole. Furthermore, since the touch pad is exposed so as to be directly in contact with the outside, dust can be directly deposited on the touch pad. Thus, the performance of the touch pad deteriorates. In addition, the touch pad is disposed in the main portion via the engaging member, thus reducing available space inside the main portion.

SUMMARY OF THE INVENTION

In view of this, the invention provides a notebook computer and a manufacturing method thereof, wherein the computer's touch pad is installed without the need for a dedicated opening breaching the housing.

Accordingly, the invention provides a notebook with a surface mounted touch pad. The notebook computer includes a main portion, a display, and a touch pad. The main portion includes a housing, formed with a receiving portion. The display is connected to the main portion in a rotatable manner. The receiving portion is formed on the internal surface of the housing and thus is not exposed by the housing. The touch pad is disposed in the receiving portion.

In a preferred embodiment, the housing includes an external surface facing the display and an internal surface opposite to the external surface, and the receiving portion is formed on the internal surface.

Furthermore, a flange is formed on the external surface, and the flange corresponds to the receiving portion. The flange surrounds the area on the external surface, corresponding to the receiving portion.

The receiving portion has a concave portion formed on the internal surface of the housing.

In another preferred embodiment, the notebook computer further includes an adhesive member to adhere the touch pad to the receiving portion.

Furthermore, the touch pad is closely adjacent to the receiving portion via the adhesive member to eliminate any gap therebetween.

In another preferred embodiment, the thickness of the housing at the receiving portion is about 0.5-0.8 mm.

In another preferred embodiment, the difference between the thickness of the housing at the receiving portion and that of a portion, adjacent to the receiving portion, of the housing is about 0.7-11.0 mm.

In another preferred embodiment, a ratio of the housing at the receiving portion to a portion, adjacent to the receiving portion, of the housing is about ⅓-½.

In this invention, a method for manufacturing a notebook computer with a surface mounted touch pad is provided. The method includes the following steps. A housing with a receiving portion is formed, and a touch pad is provided. The touch pad is adhered on the receiving portion.

In another preferred embodiment, the method further includes the following steps. An adhesive member is provided. The touch pad is adhered on the receiving portion via the adhesive member to eliminate any gap between the touch pad and the housing.

In another preferred embodiment, the housing is formed by injection molding.

In another preferred embodiment, the receiving portion is formed on the housing formed with a concave portion.

BRIEF DESCRIPTION OF THE DRAWINGS

The present invention can be more fully understood by reading the subsequent detailed description and examples with references made to the accompanying drawings, wherein:

FIG. 1b is a cross section along a line b-b in FIG. 1a;

FIG. 2c is a partial top view of a housing in FIG. 2b;

DETAILED DESCRIPTION OF THE INVENTION

Figure 1A:
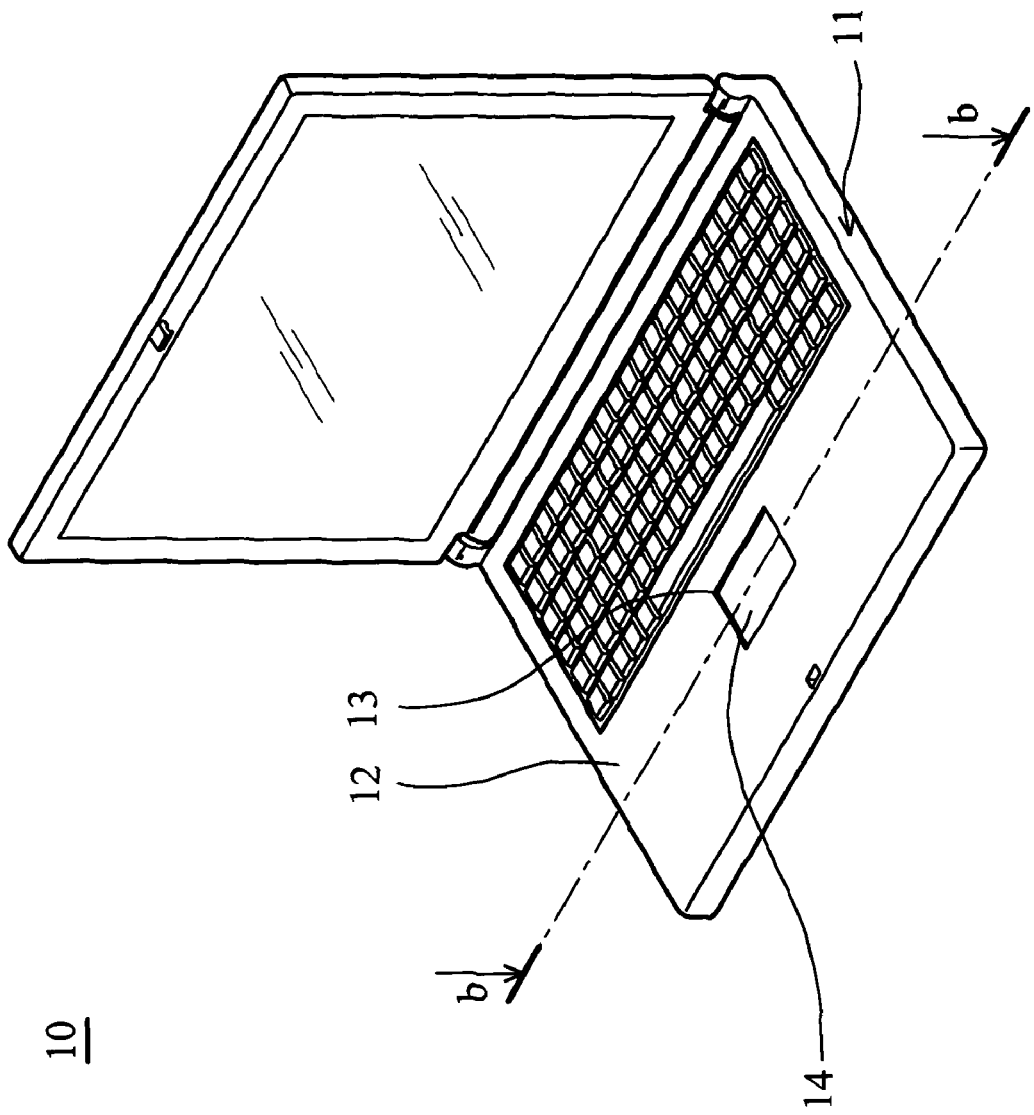
FIG. 1a is a schematic view of a conventional notebook computer.
Figure 1B:
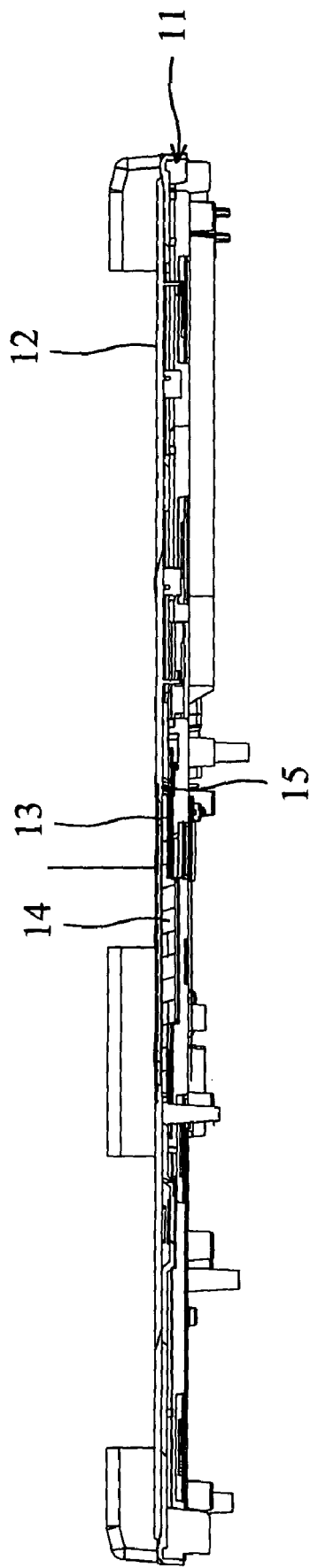

Referring to FIG. 2a, FIG. 2b, FIG. 2c, and FIG. 2d, a notebook 100 with a surface mounted touch pad as disclosed in this invention is provided. The notebook computer 100 includes a main portion 110, a display 120, and a touch pad 130.

Figure 2A:
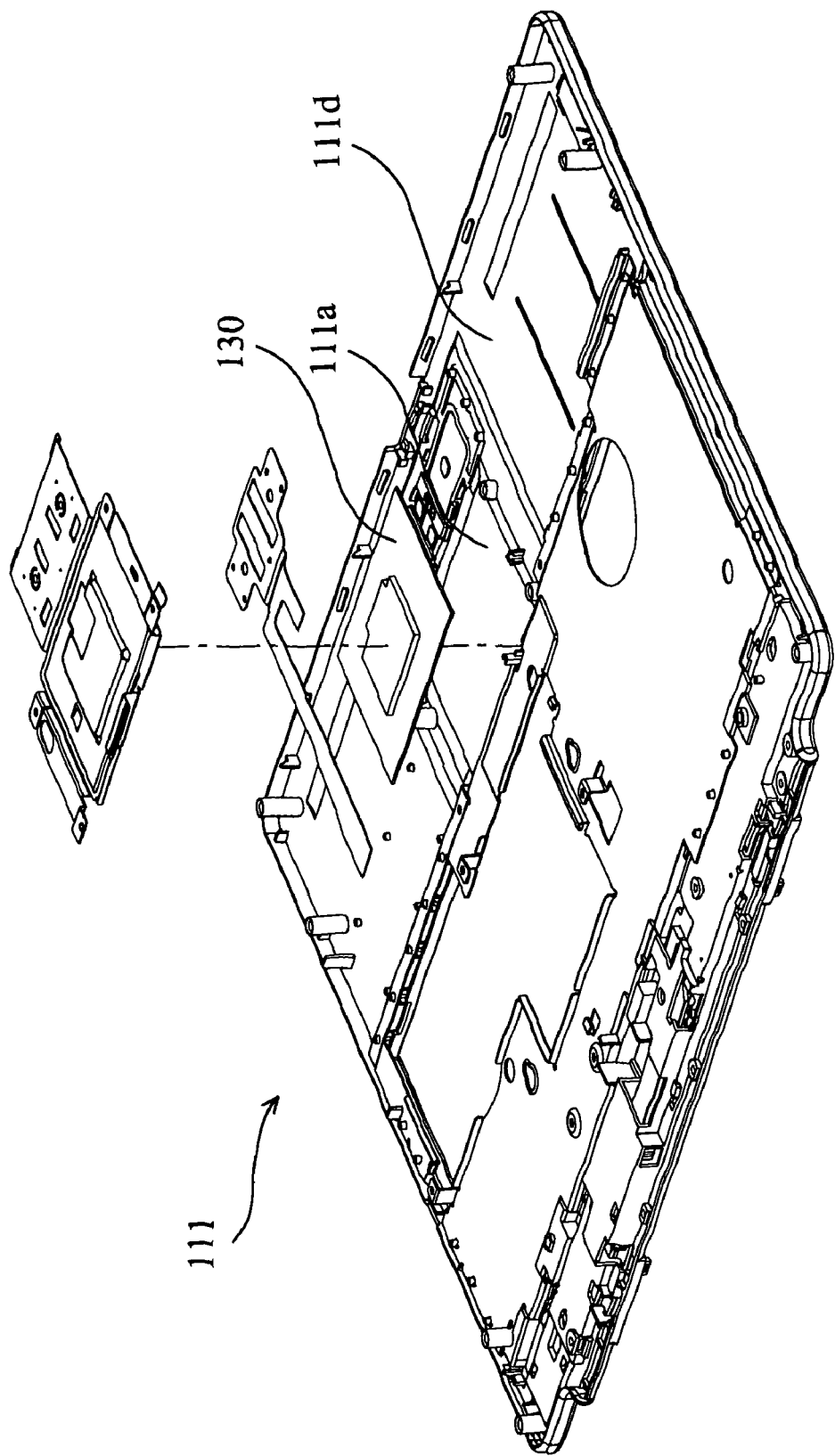
FIG. 2a is a partial exploded view of a notebook computer as disclosed in this invention.
Figure 2B:
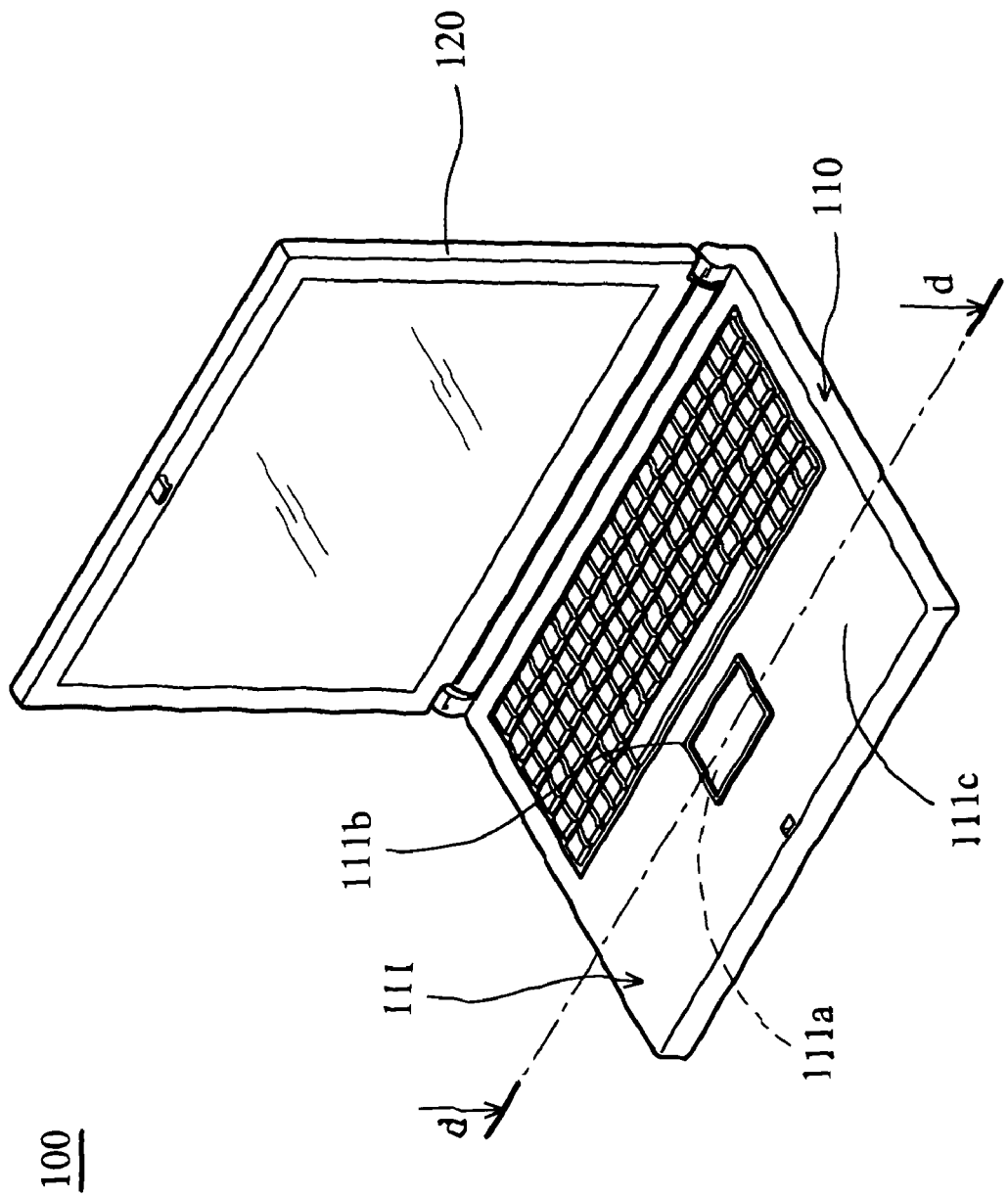
FIG. 2b is a schematic view of a notebook computer as disclosed in this invention.
Figure 2D:
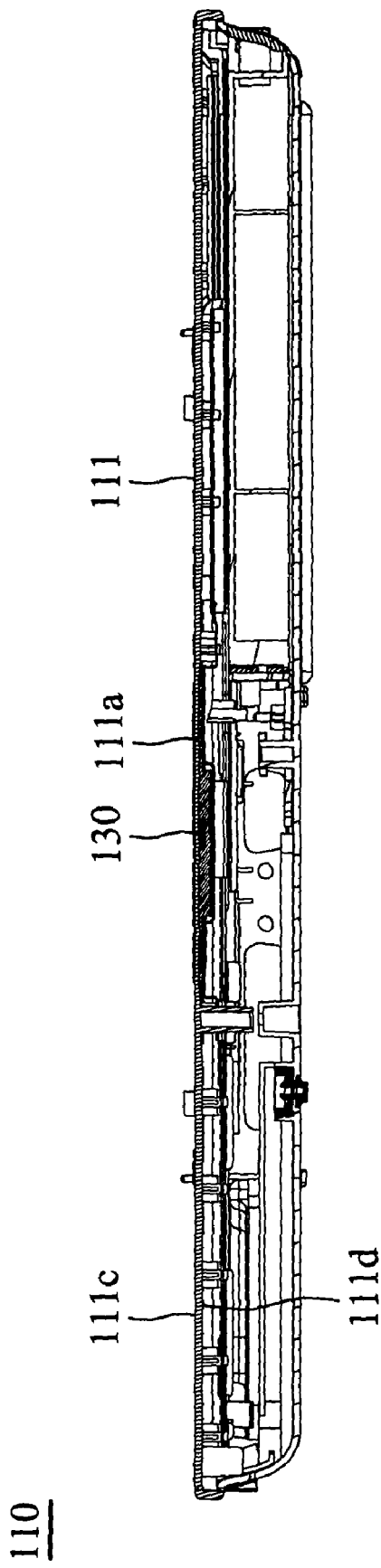
FIG. 2d is a cross section along a line d-d in FIG. 2c.

The main portion 110 is a basic component of the notebook computer 100, and is provided with necessary devices required by the notebook computer 100 therein. In addition, the main portion 110 includes a top housing 111 as shown in FIG. 2b. Referring to FIG. 2b and FIG. 2d, the top housing 111 includes a first surface 111c (the external surface) and a second surface 111d (the internal, and unexposed surface) on the underside of the first surface 111c. The top housing 111 is formed with a receiving portion 111a on the second surface 111d. The touch pad 130 is disposed is in the receiving portion 111a. It is noted that the receiving portion 111a has a concave portion formed on the second surface 11d of the housing 111 in FIG. 2a and FIG. 2d. However, the formation of the receiving portion 111a is not limited to this as long as the touch pad 130 can be disposed therein and unexposed by the top housing 111.

The main portion 110 is a basic component of the notebook computer 100, and is provided with necessary devices required by the notebook computer 100 therein. In addition, the main portion 110 includes a top housing 111 as shown in FIG. 2b. Referring to FIG. 2b and FIG. 2d, the top housing 111 includes a first surface 111c (the external surface) and a second surface 111d (the internal, and unexposed surface) on the underside of the first surface 111c. The top housing 111 is formed with a receiving portion 111a on the second surface 111d. The touch pad 130 is disposed is in the receiving portion 111a. It is noted that the receiving portion 111a has a concave portion formed on the second surface 11d of the housing 111 in FIG. 2a and FIG. 2d. However, the formation of the receiving portion 111a is not limited to this as long as the touch pad 130 can be disposed therein and unexposed by the top housing 111.

It is noted that the thickness of the top housing 111 at the receiving portion 111a is thinner that of a portion adjacent to the receiving portion 111a, of the top housing 111. Thus, the touch pad 130 is more sensitive and performance thereof is enhanced. For example, when the standard thickness of the top housing 111 is 1.5 mm, the thickness of the top housing 111 at the receiving portion 111a may be 0.5-0.8 mm. That is, the difference between the thickness of the top housing 111 at the receiving portion 111a and that of the portion, adjacent to the receiving portion 111a, of the top housing 111 may be 0.7-1.0 mm. Put simply, a ratio of the top housing 111 at the receiving portion 111a to the portion, adjacent to the receiving portion 111a, of the top housing 111 is ⅓-½.

In addition, as shown in FIG. 2c, the top housing 111 may be formed with a flange 111b on the first surface 111c, and the position of the flange 111c corresponds to the periphery of the receiving portion 111a. Thus, the user can conveniently identify the position of the touch pad 130 by touching or seeing the flange 111b.

The display 120 is disposed on the main portion 110 in a rotatable manner to displays the information of the notebook computer 100. As stated above, the receiving portion 111a is formed on the second surface 111d of the top housing 111; and therefore does not face the display 120. The touch pad 130 is disposed in the receiving portion 111a on the second surface 111d of the top housing 111, to perform cursor movement and other interaction with the computer. As shown in FIG. 2a and FIG. 2b, the touch pad 130 is disposed in the main portion 110; in such a way that the main portion 110 is not exposed. Thus, before the touch pad 130 is disposed in the receiving portion 111a, a protective film (not shown) can be removed from the touch pad 130. As a result, the thickness of the entire touch pad 130 can be reduced, and the sensitivity of the touch pad 130 can be enhanced.

Figure 2E:
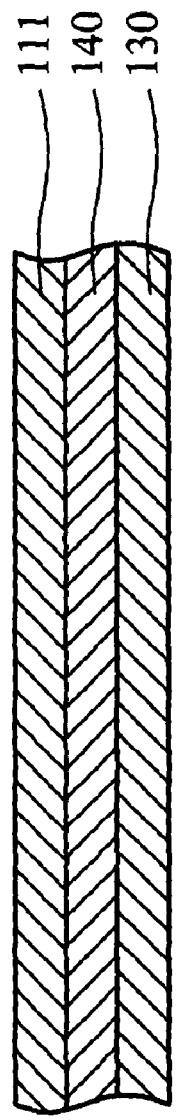
FIG. 2e is a partially enlarged view of a touch pad and a receiving portion in FIG. 2d.

Furthermore, referring to FIG. 2e, the notebook computer 100 further includes an adhesive member 140. The adhesive member 140 is located between the touch pad 130 and the receiving portion 111a, and the touch pad 130 is adhered to the receiving portion 111a. Thus, the touch pad 130 is closely adjacent to the receiving portion 111a via the adhesive member 140 eliminating any gap therebetween.

It is understood that the adhesive member 140 may be a double paper double sides adhesive.

The structure of the notebook computer 100 is described as above, and its manufacturing method is described as follows.

Figure 3:
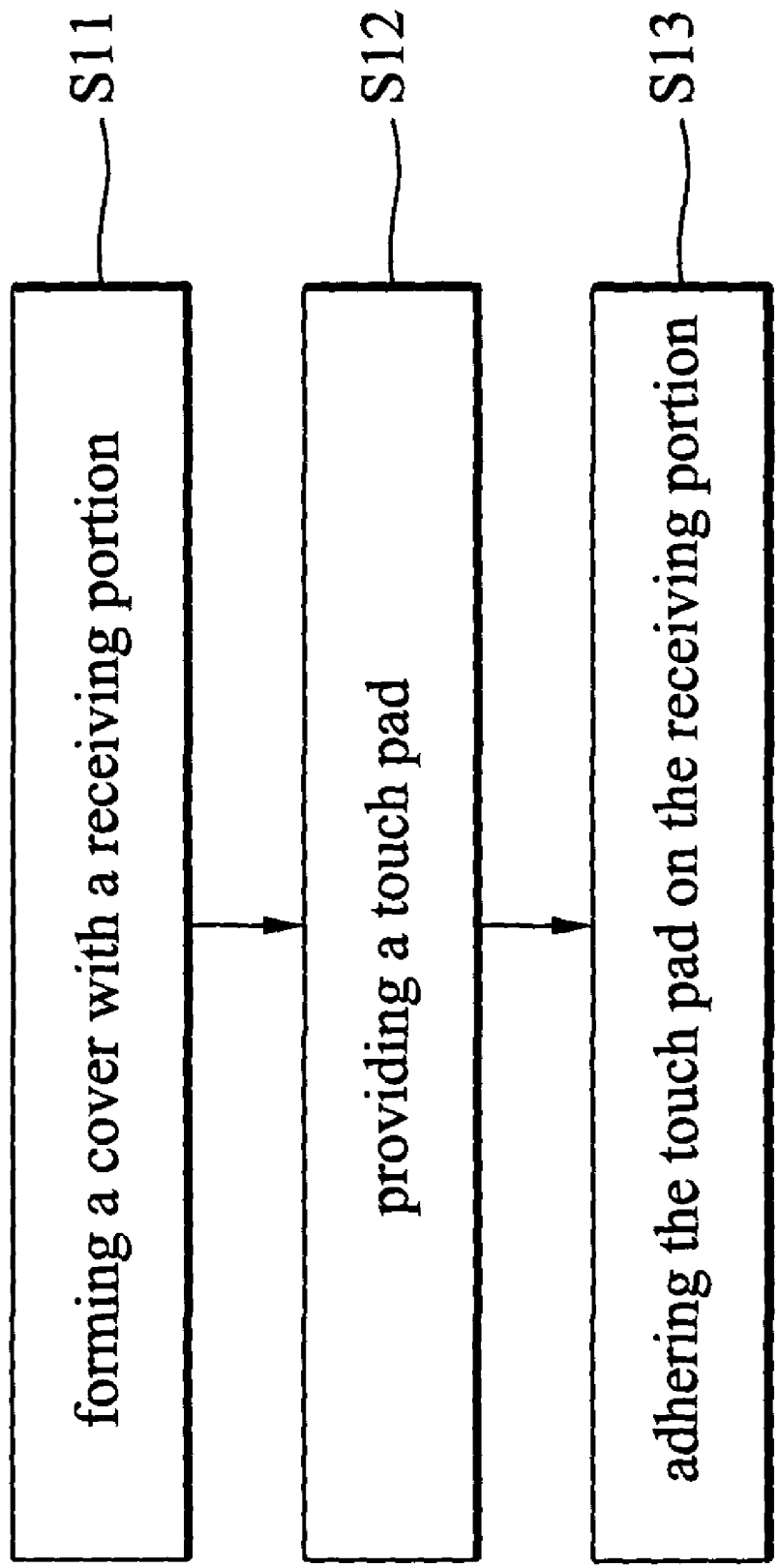
FIG. 3 is a flow chart showing a method for manufacturing a notebook computer as disclosed in this invention.

As shown in FIG. 3, a method, for manufacturing the notebook computer 100, includes the following steps. First, in step S11, a housing 111 with a receiving portion 111a as shown in FIG. 2d is formed. Then, in step S12, the touch pad 130 and the adhesive member 140 are provided. Finally, in step S13, the touch pad 130 is adhered on the receiving portion 11a via the adhesive member 140 to eliminate any gap therebetween.

It is understood that the housing 111 may be formed by injection molding.

As stated above, since the touch pad is disposed in the main portion without forming a hole at the top housing, the top housing to prevent water from entering the main portion. Furthermore, external dust cannot be deposited on the touch pad. Thus, optimizing the performance of the touch pad. In addition, since the receiving portion is a concave portion on the top housing, the combined thickness of the top housing and the touch pad is less than that in a conventional notebook computer. Thus, the space inside the main portion of the notebook computer can be increased, and device arrangement inside the main portion is more flexible.

While the invention has been described by way of example and in terms of the preferred embodiment, it is to be understood that the invention is not limited to the disclosed embodiment. To the contrary, it is intended to housing various modifications and similar arrangements (as would be apparent to those skilled in the art). Therefore, the scope of the appended claims should be accorded the broadest interpretation so as to encompass all such modifications and similar arrangements.

What is claimed is:

1. A notebook computer with a hidden touch pad, comprising:
    a display;
    a main portion connected with the display and including a housing, wherein the housing has a first surface and a second surface, a receiving portion formed in the second surface and not exposed to the first surface, wherein a thickness of the housing that the receiving portion forms therein is thinner than that of the housing that the receiving portion does not form therein and a ratio between a thickness of the housing that the receiving portion forms therein and a thickness of the housing that the receiving portion does not form therein is ⅓-½:1; and
    a touch pad disposed onto the receiving portion.

2. The notebook computer as claimed in claim 1, wherein the housing further includes a flange on the first surface, and the flange surrounds a surface corresponding to the receiving portion.

3. The notebook computer as claimed in claim 2, wherein the flange is an identifier.

4. The notebook computer as claimed in claim 1, further comprising:
    an adhesive member adhering the touch pad to the receiving portion.

5. The notebook computer as claimed in claim 4, wherein the touch pad is closely adjacent to the receiving portion via the adhesive member, thereby eliminating any gap between the receiving portion and the touch pad.

6. The notebook computer as claimed in claim 1, wherein a thickness of the housing that the receiving portion forms therein is about 0.5-0.8 mm.

7. The notebook computer as claimed in claim 1, wherein a difference between a thickness of the housing that the receiving portion forms therein and a thickness of the housing that the receiving portion does not form therein is 0.7-1.0 mm.

8. A method for manufacturing a notebook computer with a hidden touch pad, comprising:
    forming a housing having a first surface and a second surface, wherein a receiving portion formed in the second surface and not exposed to the first surface, wherein a thickness of the housing that the receiving portion forms therein is thinner than that of the housing that the receiving portion does not form therein and a ratio between a thickness of the housing that the receiving portion forms therein and a thickness of the housing that the receiving portion does not form therein is 1/3-1/2:1; and adhering a touch pad onto the receiving portion.

9. The method as claimed in claim 8, further comprising:
providing an adhesive member to adhere the touch pad on the receiving portion via the adhesive member.

10. The method as claimed in claim 8, wherein a thickness of the housing that the receiving portion forms therein is about 0.5-0.32 mm.

11. The method as claimed in claim 8, wherein a difference between a thickness of the housing that the receiving portion forms therein and a thickness of the housing that the receiving portion does not form therein is 0.7-1.0 mm.

12. The method as claimed in claim 8, wherein the housing is formed by injection molding.

13. The method as claimed in claim 8, further comprising to form a flange on the first surface, and the flange surrounds a surface corresponding to the receiving portion.

14. The method as claimed in claim 13, wherein the flange is an identifier.

15. A notebook computer, comprising:
a display;
a main portion pivotally connected with the display and allowing the display to pivot between a closed position and an opened position, and including a housing, wherein the housing has a first surface to be adjacent to the display when the display is in the closed position, a second surface formed opposite to the first surface and a first identification portion formed on the second surface; and
a touch pad disposed on the first identification portion;
wherein a second identification portion is formed on the first surface and corresponding to the first identification portion, thereby to identify the position of the first identification portion and the touch pad, wherein a ratio between a thickness of the housing that the first identification portion forms and a thickness of the housing that the first identification portion does not form is 1/3-1/2:1.

16. The notebook computer as claimed in claim 15, wherein the second identification portion is surrounded by a flange.

17. The notebook computer as claimed in claim 15, wherein a thickness of the housing that the first identification portion forms is thinner than that of the housing that the first identification portion does not form.

18. The notebook computer as claimed in claim 15, wherein a thickness of the housing that the first identification portion forms is about 0.5-0.8 mm.

19. The notebook computer as claimed in claim 15, wherein a difference between a thickness of the housing that the first identification portion forms and a thickness of the housing that the first identification portion does not form is 0.7-1.0 mm.

* * * * *